United States Patent
Sheppard et al.

(10) Patent No.: US 6,518,339 B1
(45) Date of Patent: Feb. 11, 2003

(54) ALDEHYDE EMISSION REDUCTION FOR DIBENZYLIDENE SORBITOL CLARIFIED PLASTICS

(75) Inventors: Shawn R. Sheppard, Spartanburg, SC (US); John G. Lever, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/663,901

(22) Filed: Sep. 18, 2000

(51) Int. Cl.[7] .............. C08K 5/25; C08K 5/04; C07D 319/20
(52) U.S. Cl. ............. 524/191; 524/108; 524/397; 524/399; 524/593; 549/201
(58) Field of Search ............... 524/191, 397, 524/399, 108, 593; 549/201

(56) References Cited

U.S. PATENT DOCUMENTS

| | | | | |
|---|---|---|---|---|
| 3,152,101 A | * | 10/1964 | Dolce | 524/191 |
| 3,626,030 A | * | 12/1971 | Wolters | 524/593 |
| 3,884,874 A | * | 5/1975 | Rosenberger et al. | 524/191 |
| 4,419,473 A | | 12/1983 | Mahaffey, Jr. | 524/104 |
| 4,532,280 A | * | 7/1985 | Kobayashi et al. | 524/108 |
| 5,049,605 A | | 9/1991 | Rekers | 524/108 |
| 5,135,975 A | | 8/1992 | Rekers | 524/108 |
| 5,241,080 A | * | 8/1993 | Kobayashi et al. | |
| 5,663,223 A | * | 9/1997 | Teumac et al. | 524/108 |
| 5,804,620 A | * | 9/1998 | Amos | 524/99 |
| 5,852,159 A | * | 12/1998 | Zah et al. | 528/363 |
| 5,856,385 A | | 1/1999 | Mehrer et al. | 524/108 |
| 6,043,303 A | * | 3/2000 | Kobayashi et al. | 524/108 |

FOREIGN PATENT DOCUMENTS

| | | | |
|---|---|---|---|
| EP | 0 969 089 | 1/2000 | ............ C12N/9/96 |
| JP | SHO 60 1985-32791 | 2/1985 | |
| JP | SHO 60 1985-42385 | 3/1985 | |
| JP | 2-59587 | 2/1990 | ......... C07D/493/04 |
| JP | 02-59587 | * 2/1990 | |
| JP | HEI 9 1997-286787 | 4/1996 | |
| JP | HEI 9 1997-286788 | 4/1996 | |
| WO | 95/16366 | 6/1995 | ......... A23L/3/3436 |

* cited by examiner

Primary Examiner—Peter Szekely
(74) Attorney, Agent, or Firm—Terry T. Moyer; Thomas L. Moses

(57) ABSTRACT

An additive that is used in conjunction with certain dibenzylidene sorbitol-type (DBS) clarifiers and acid scavengers within polyolefin resins to reduce the release of aldehydes from polypropylene material is disclosed. Hydrazides have been shown to be effective at removing residual aldehyde from polyolefins, such as polypropylene. This function can be accomplished with a minimal impact on optical transparent properties imparted to the polypropylene by the clarifying agent. The net effect is an improvement in the organoleptic performance of resins containing clarifiers, and a reduction in the UV-absorbing extractables. Particularly, adipic dihydrazide, when co-compounded into polypropylene homopolymer with 4-methyl DBS, improves the organoleptic performance of the clarifier. Incorporation of dihydrazides into polypropylene pellets reduced air-released aldehyde by nearly 100%.

27 Claims, No Drawings

ALDEHYDE EMISSION REDUCTION FOR DIBENZYLIDENE SORBITOL CLARIFIED PLASTICS

FIELD OF THE INVENTION

The present invention is generally related to clarifying agents or transparency enhancing agents used in conjunction with polyolefin resins, such as polypropylene. More specifically, the present invention includes an additive that is used in conjunction with certain dibenzylidene sorbitol-type (DBS) clarifiers within polyolefin resins to reduce the release of aldehydes formed as a result of the use of such clarifying agents.

BACKGROUND OF THE PRIOR ART

Various techniques have been used in the past to clarify different types of plastics, such as polypropylene. One commercially successful method for clarifying plastics is by using a form of dibenzylidene sorbitol as a clarifying agent. One such clarifying agent, bis(3,4-dimethylbenzylidene) sorbitol acetal (alternatively referred to as 3,4-DMDBS), and its methods of use are described in detail in U.S. Pat. No. 5,135,975 and 5,049,605, both issued to Rekers. As used herein, the term polyol actetal refers to the reaction product of a polyol and an aldehyde, which includes dibenzylidene sorbitol (DBS) compounds and dibenzylidene xylitol (DBX) compounds. All patents mentioned herein are incorporated by reference in their entirety.

One problem that is generally associated with the use of other types of DBS clarifying agents, such as 4-methyl DBS (alternatively referred to as MDBS), is that certain by-products are produced, such as aldehydes, which tend to migrate out of the plastic after formation thereof. 4-Ethyl DBS, 4-chloro DBS, and 2,4-dimethyl DBS are other clarifiers with similar deficiencies. Certain sorbitol acetal clarifiers, including 4-methyl DBS, are not completely heat or acid stable and partially decompose somewhat during the processing of polyolefins, which produces the undesirable by-product of aldehydes.

This release of aldehydes is usually noticeable to users as a smell or taste, and may significantly impact the smell and taste of foods stored in a plastic container made using certain DBS clarifying agents.

It would be desirable to prevent the release of aldehydes from clarified plastics, particularly in applications where the plastic is used for food containers, and other uses where food will come into contact directly with the clarified plastic. Other applications where it is absolutely crucial to prevent release of aldehydes from plastics includes the medical field, for such uses as pre-filled syringes, etc. Several attempts have been made to address this problem, with varying degrees of success.

Different types of DBS agents have been used as plastic clarifiers, including alkyl substituted DBS compounds, which may decompose during melt processing, resulting in the formation of substituted benzaldehydes. One approach for addressing this problem has been to try to stabilize the DBS agents, for instance, by co-compounding them with certain acid acceptors, as disclosed in U.S. Pat. No. 4,419,473, issued to Mahaffey, Jr.

Other attempts to stabilize DBS agents are disclosed in Japanese patent applications Hei 9[1997]-286787 and Hei 9[1997]-286788, by Ikeda et al. These patent applications are directed to stabilizing DBS agents by adding alkali salts of amino acids, and alternatively adding polyols to the polypropylene formulations, respectively. Matsuhira discloses pre-treatment of neat DBS powder with hydroxylamine or hydrazine derivates to reduce aldehyde content before the clarifier is compounded, in Japanese patent applications Sho 60[1985]-32791 and Sho 60[1985]-42385.

U.S. Pat. No. 5,001,176, issued to Nakazima, is directed to a crystalline polyolefin composition that contains a dibenzylidene sorbitol type compound and a cyclodextrin. U.S. Pat. No. 5,856,385, issued to Mehrer, relates to the use of nucleating agents based on dibenzylidene sorbitol, or derivates thereof, in combination with amido-functional compounds.

None of the prior art, however, discloses the use of hydrazide or hydrazine agents as an additive to a DBS enhanced polyolefin resin in order to prevent eventual release of malodorous and foul tasting aldehyde compounds from the final product. As used herein, the terms hydrazine and hydrazide refer to compounds that contain singly bonded nitrogens, one of which is a primary amine functional group.

OBJECTS OF THE INVENTION

Accordingly, it is an important object of the present invention to provide an additive to be used with dibenzylidene sorbitol-type clarifying agents for polyolefin resins for the purpose of reducing the amount of aldehydes released from the final plastic product. Another important object of the present invention is to provide a compound that reacts with aldehydes to form a water insoluble product, which is chemically stable within DBS clarified plastic products. Yet another important object of the present invention is to provide an additive to be used in conjunction with DBS clarifying agents to prevent undesirable smells and tastes from being released from a final plastic product. Still another important object of the present invention is to provide an aldehyde scavenging compound that will not significantly affect the transparent optical properties of a clarified polymer, such as polypropylene. Another important object of the present invention is to provide an additive that is effective in reducing or eliminating the release of aldehydes from plastics treated with a variety of different DBS-type clarifying agents. Yet another important object of the present invention is to provide a mixture and method for clarifying polyolefin products, which provides a significantly reduced level of released aldehydes than prior attempts have yielded.

These and other features, aspects, and advantages of the present invention will become better understood with reference to the following description and appended claims.

DETAILED DESCRIPTION OF THE INVENTION

In order to provide an additive for DBS-type clarifiers to reduce the malodorous and foul tasting aldehydes from migrating out of plastics, it is necessary that such an additive exhibit certain qualities. It must react selectively with aldehydes to form a water insoluble, non-toxic product that is stable within a polypropylene polymer matrix. Further, such an additive must not negatively affect the optical transparent properties imparted to the polypropylene by the DBS-type clarifying agent. The desired additive should be inexpensive to manufacture in commercial quantities, as well.

It has been found that the addition of certain hydrazide compounds to DBS enhanced polypropylene products in combination with certain acid scavengers significantly reduces the eventual release of aldehydes from the plastic after formation thereof. Suitable acid scavengers useful for this purpose include, without limitation, hydrotalcite, sodium stearate, calcium stearate, lithium stearate, and calcium stearyl lactate. As used herein, an aldehyde scavenger or acid scavenger is defined as a compound that readily reacts with aldehydes or acids, respectively. Also, the terms "hydrazide" or "hydrazide compound" are defined herein as encompassing dihydrazide compounds as well.

Specifically, it is believed that certain hydrazide compounds form a water insoluble reaction product with aldehydes within polypropylene products, thereby eliminating or significantly reducing the levels of aldehydes released from the plastic. Both hydrazides and hydrazines are known to react readily with aldehydes to form hydrazones.

A group of hydrazide compounds was synthesized and tested to determine which compounds would perform the function of preventing or reducing aldehyde release from DBS enhanced polypropylene products. Adipic dihydrazide, eicosanedioic acid dihydrazide, glutaric dihydrazide, pimelic dihydrazide, sebacic dihydrazide and suberic dihydrazide were the subject compounds of the tests. Further, sulfonyl hydrazides and N-amino imides may be used as well.

PREFERRED EMBODIMENTS OF THE INVENTION

The following examples serve to illustrate the subject matter of the present invention and are not to be construed as limiting the scope of the invention.

Plastic Compounding

Additives were weighed and mixed with a reactor-grade polypropylene using a Welex high-intensity mixer operating at 1600 rpm. The general formulation was 1.00 kg resin, 0.500 g Irganox 1010, 1.00 g Irgafos 168, and 0.800 g calcium stearate, plus clarifier and hydrazide, when applicable. The mixed powders were then extruded on a Killion 24:1 single-screw extruder using a 400/425/450/450° F. heating profile and pelletized. 50-mil plaques of each formulation were prepared using a 25-ton Arburg injection molder using a flat 220° C. barrel profile.

Hydrazide Production

The following method illustrates the general procedure for the manufacture of the hydrazides herein:

EXAMPLE 1

To a 100 ml round-bottom flask equipped with condenser, heating mantle, and magnetic stirrer was charged 10.0 g [0.043 mol] of dimethyl sebacate (Aldrich Chemical Co.), 16 ml of ethanol, and 5.3 ml [0.090 mol] of hydrazine hydrate (55%). This mixture was heated at reflux for six hours. The solids were then collected by suction filtration and washed by stirring in 100 ml of ethyl acetate, yielding sebacic dihydrazide (5.1 g, 51 %) as a white solid.

The product (as well as those in EXAMPLEs 1–6 and the plastic compositions, below) were analyzed for certain properties as follows: UV/V is (Ultraviolet/Visible) spectra were obtained using a Beckman DU-650 Spectrophotometer. GC/MS data were obtained with a Hewlett Packard 6890 GC/5973 MSD. Haze measurements were made on a BYK-Gardner Hazegard Plus, in accordance with ASTM D1003.

The product of this Example exhibited a melting point (at 3° C./min, air) of 183.8–185.3° C.; and a purity of 95.9% (GC/MS).

Several other dihydrazide compounds were prepared by the method above, and those compounds are shown in Table I below.

TABLE I

Purity and melting point data for hydrazides

| Example | Compound | Purity (GC/MS) | Melting Point (3° C./min, air) |
|---|---|---|---|
| Example 2 | Adipic dihydrazide | 99+% | 182.5–185.5° C. |
| Example 3 | Eicosanedioic acid dihydrazide | 90+%* | 180.1–182.2° C. |
| Example 4 | Glutaric dihydrazide | 96.1% | 176.3–178.6° C. |
| Example 5 | Pimelic dihydrazide | 95.5% | 183.2–185.0° C. |
| Example 6 | Suberic dihydrazide | 95.9% | 186.9–189.1° C. |

*Unable to determine by GC/MS. FTIR and NMR appear clean.

Haze Measurements of Compounded Plastics

The additives of EXAMPLEs 1–6 were compounded within plastics (as described above). The resultant haze was then measured for each, as well as for comparative plastics not containing such additives. The results were tabulated as follows:

TABLE II

Haze [ASTM D1003]

| Clarifier @ 2200 ppm | Hydrazide Additive | Hydrazide Loading | Resin* | Haze (%) |
|---|---|---|---|---|
| MDBS | — | — | RCP | 8.7 |
| MDBS | — | — | RCP | 8.8 |
| MDBS | EX. 2 | 500 ppm | RCP | 10.8 |
| MDBS | EX. 2 | 500 ppm | RCP | 10.3 |
| 3,4-DMDBS | — | — | HP | 12.8 |
| 3,4-DMDBS | EX. 4 | 500 ppm | HP | 11.9 |
| 3,4-DMDBS | EX. 2 | 500 ppm | HP | 11.7 |
| 3,4-DMDBS | EX. 5 | 500 ppm | HP | 13.3 |
| 3,4-DMDBS | EX. 6 | 500 ppm | HP | 13.5 |
| 3,4-DMDBS | EX. 1 | 500 ppm | HP | 13.4 |
| 3,4-DMDBS | EX. 3 | 500 ppm | HP | 12.2 |

*RCP = random PP copolymer, 11 MFI; HP = PP homopolymer, 12 MFI

The data shown in Table II demonstrate that at 500 ppm the hydrazide additives (EXAMPLEs 1–6) have a minimal impact on the overall clarity of the resin, and some improve haze.

Organoleptic Performance

Organoleptic testing was carried out based on the general guidelines given in ASTM STP 434 and STP 758. Six 3"×2"×0.05" plaques of both formulations listed in Table III were placed into ajar containing 700 ml of tap water. Glass pipettes were used to separate the plaques and ensure all surface area was exposed to the extraction water. These jars were then placed into an oven and held at 50° C. for five days. The jars were refrigerated for one day and the extraction water was decanted into cups for taste testing. Each of eleven judges were presented with two pairs of cups and asked to evaluate each cup in a pair against the other and report in which water sample they detected the least taste. The pair tasted contained extraction water from plaques containing 2200 ppm MDBS and extraction water from a similar formulation that additionally had been compounded with 500 ppm of adipic dihydrazide (ADH) (EXAMPLE 2, above). When run in accordance with the ASTM procedures, a statistically significant majority of judges is nine. Results from two individual taste tests are shown in Table III.

TABLE III

Taste test results for adipic dihydrazide-scavenged MDBS formulations

| | Number of Judges Selecting Listed Formulations as Having Least Taste | |
|---|---|---|
| Trial | General Formulation + 2200 ppm MDBS | General Formulation + 2200 ppm MDBS + 500 ppm ADH |
| First | 2 | 9 |
| Second | 0 | 11 |

This comparative test demonstrates that the organoleptic performance of resin containing MDBS is improved when dihydrazide is incorporated into the formulation.

Aldehyde Migration

Testing was then conducted to determine the emission reduction of aldehyde from the compounded plastics. The test procedures were as follows: To sample air-released aldehyde, 3 g of pellets of each formulation were placed in a sealed vial and heated at 110° C. in a heating block for a minimum of 20 min. The solid phase microextraction (SPME) fiber (divinyl benzene/Carboxen/polydimethyl siloxane) was then exposed to the sample headspace for 3.0 minutes as the heating block cooled. Immediately following this procedure, the SPME fiber was exposed to the inlet of the GC/MS for 2.0 minutes. The inlet was configured for splitless injection and was held at 300° C. After elution of the volatile components of the headspace, the ions of interest were extracted from the total ion count (m/z 119 mass units for 4-methylbenzaldehyde).

The abundance of this ion observed from the headspace of the unscavenged sample of pellets was then compared to the abundance in the scavenged samples using the same sampling method and the same mass of pellets. The comparison used was an index based on the maximum peak height in the m/z 119 ion chromatogram for each sample in a region ±10% of the retention time observed for the unscavenged sample. The relative peak height for each sample is given in Table IV. In each sample that contained a hydrazide, at least a 98% reduction in peak height was observed versus the unscavenged MDBS control.

TABLE IV

Relative peak heights for selected m/z 119 peak in scavenged resins

| Clarifier @ 2200 ppm | Hydrazide Additive | Hydrazide Loading | Resin | Indexed m/z 119 peak ht. |
|---|---|---|---|---|
| MDBS | — | — | HP | 1.000 |
| MDBS | EXAMPLE 4 | 500 ppm | HP | 0.014 |
| MDBS | EXAMPLE 2 | 500 ppm | HP | 0.020 |
| MDBS | EXAMPLE 5 | 500 ppm | HP | 0.019 |
| MDBS | EXAMPLE 6 | 500 ppm | HP | 0.021 |
| MDBS | EXAMPLE 1 | 500 ppm | HP | 0.019 |
| MDBS | EXAMPLE 3 | 500 ppm | HP | 0.014 |

Thus, it is evident that the inventive compositions demonstrate that the level of aldehydes released into the air is reduced when hydrazides are incorporated into DBS-clarified formulations.

UV/VIS Measurement of Extracted Aldehyde

Testing was then conducted to determine the extent of aldehyde extraction from the compounded plastics. The testing procedures were as follows: Retort testing was performed per the Japanese Pharmacopoeia protocol (Japanese Pharmacopoeia, 13th ed. 1996: 76–82). Seven 50-mil plaques of each formulation were cut into 9 strips, rinsed with water, and placed into clean 1 quart Mason jars containing 200 ml of deionized water. The jars were covered with aluminum foil and autoclaved for 1 hour. The extraction water was then analyzed for UV absorbance between 220–240 nm and from 241–350 nm, after a suitable blank had been tested. Powderless latex gloves were worn during the entire procedure.

Plaques containing 3,4-DMDBS alone yielded absorbances of 0.388 and 0.154 units at 220–240 and 241–350 nm, respectively. With the exception of glutaric dihydrazide, both absorbances decreased dramatically when each of the other hydrazides were incorporated into the formulations. The best performer was pimelic dihydrazide. When this compound was included in the formulation with 3,4-DMDBS, the peak absorbances between 220–240 and 241–350 nm were reduced 70% and 80%, respectively, as shown in Table V.

TABLE V

Retort performance of aldehyde-scavenged formulations

| Clarifier @ 2200 ppm | Hydrazide Additive | Hydrazide Loading | Resin | 220–240 nm UV abs | 241–350 nm UV abs |
|---|---|---|---|---|---|
| Control | — | — | HP | 0.018 | 0.008 |
| 3,4-DMDBS | — | — | HP | 0.388 | 0.154 |
| 3,4-DMDBS | EX. 4 | 500 ppm | HP | 0.423 | 0.241 |
| 3,4-DMDBS | EX. 2 | 500 ppm | HP | 0.142 | 0.051 |
| 3,4-DMDBS | EX. 5 | 500 ppm | HP | 0.122 | 0.034 |
| 3,4-DMDBS | EX. 6 | 500 ppm | HP | 0.145 | 0.038 |
| 3,4-DMDBS | EX. 1 | 500 ppm | HP | 0.169 | 0.037 |
| 3,4-DMDBS | EX. 3 | 500 ppm | HP | 0.150 | 0.027 |

Thus, it is evident that the inventive compositions demonstrate a reduction in the extraction of UV-absorbing compounds from clarified resin compositions when hydrazides are employed in the formulations.

Solubility Tests on the Hydrazide/Aldehyde Reaction Product

The reaction product of hydrazide and aldehyde was then tested for water solubility. The test involved the following: To a 10-ounce sample vial was charged 30 ml of tap water and 0.14 g (0.8 mmol) of adipic dihydrazide. This mixture was shaken until a clear, colorless solution was obtained. 4-Methylbezaldehyde (0.14 g, 1.3 mmol) was added to the solution and the mixture was shaken for one minute, immediately precipitating a white solid. The mixture was then allowed to stand for an additional ten minutes, followed by collection of the solids by suction filtration to obtain 0.14 g (0.6 mmol, 97%) of the (bis 4-methyl)adiponylbis (hydrazone). Thus, it is evident that the reaction product is substantially insoluble in water.

Hydrazides have been shown to be effective at removing residual aldehyde from polypropylene. This can be accomplished with a minimal impact on haze. The net effect is an improvement in the organoleptic performance of resins containing clarifiers, and a reduction in the UV-absorbing extractables. Particularly, adipic dihydrazide, when co-compounded into polypropylene homopolymer with 4-methyl DBS, improves the organoleptic performance of the clarifier. Incorporation of dihydrazides into polypropylene pellets reduced headspace aldehyde by nearly 100%, and improved the retort performance of 3,4-DMDBS, as shown. Although hydrazides have been shown as effective aldehyde scavengers in combination with certain DBS clarifying agents and acid scavengers, it is to be understood that other suitable compounds having similar functional groups may be used for the same purpose, including hydrazines and hydroxylamine compounds, as well as derivatives thereof DBS clarified products may be useful in such end uses as medical devices, particularly syringes, prescription medicine containers, and any other medical use that requires a clarified plastic product having a low emission level for aldehydes or other chemical substances. Other uses include food storage containers, clothing containers, or any other use having the requirements listed above. Further, it is anticipated that the clarified polypropylene products identified herein may be used in a variety of processes, including, but not limited to, blow molding, injection molding, extrusion, thermoforming, etc. Clarified polypropylene blow molded bottles may be used for pharmaceuticals, spices, juices, sauces, vitamins, and baby bottles, among other things. Injection molded products may include housewares, storage cases, living hinge cases, thin wall containers, and disposable syringes. Although specific examples of end uses for DBS clarified products have been described herein, those examples should not limit the scope of the invention. It is contemplated that clarified polypropylene products as described herein may be used in any number of ways.

While preferred embodiments have been disclosed and described in considerable detail, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A polyolefin composition comprising a dibenzylidene sorbitol compound having the following structure:

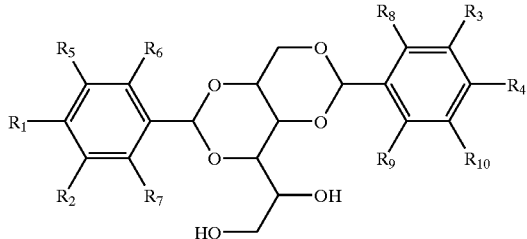

and an additive that reacts with free aldehydes present within a polyolefin matrix in order to reduce the release of said free aldehydes from said polyolefin composition; and wherein said additive includes at least one hydrazide selected from the group consisting of adipic, pimelic, suberic, glutaric sebacic, eicosanedioic dihydrazide, and any mixtures thereof.

2. The composition set forth in claim 1, wherein said additive reacts with said aldehydes to form a water-insoluble product.

3. The composition set forth in claim 1, wherein said polyolefin is polypropylene.

4. The composition set forth in claim 3, wherein said polypropylene is a homopolymer, and said additive does not negatively affect haze characteristics or said clarified homopolymer by more than about 10%, when measured on a 50 mil injection molded plaque in accordance with ASTM test method D1003.

5. The composition set forth in claim 3, wherein said polypropylene is a random copolymer, and said additive does not negatively affect haze characteristics of said clarified random copolymer by more than about 4%, when measured on a 50 mil injection molded plaque in accordance with ASTM test method D1003.

6. The composition set forth in claim 1 wherein said additive is selected from the group consisting of sulfonyl hydrazides, N-amino imides, and any mixtures thereof.

7. The composition set forth in claim 1, wherein said additive causes peak UV absorbances between 220–240 nm to be reduced by at least 10%, when compared to the same said polyolefin and said dibenzylidene sorbitol compound without said additive, as measured in accordance with the retort testing procedures of the Japanese Pharmacopoeia protocol, $13^{th}$ edition, pages 76–82 (1996).

8. The composition set forth in claim 1, wherein said additive causes peak UV absorbances between 241–350 nm to be reduced by at least 10%, when compared to the same said polyolefin and said dibenzylidene sorbitol compound without said additive, as measured in accordance with the retort testing procedures of the Japanese Pharmacopoeia protocol, $13^{th}$ edition, pages 76–82 (1996).

9. A clarifying agent for use with polyolefins, said clarifying agent comprising:

a composition including a compound having the following structure:

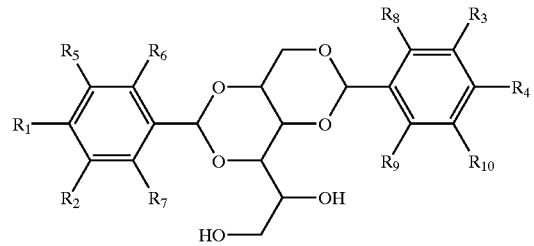

and an additive including at least one hydrazide selected from the group consisting of adipic, pimelic, suberic, glutaric sebacic, eicosanedioic dihydrazide, and any mixtures thereof.

10. The clarifying agent set forth in claim 9, wherein said dibenzylidene sorbitol compound is selected from the group consisting of MDBS, 3,4-DMDBS, Ethyl-DBS, 2,4-DMDBS, and any mixtures thereof.

11. The clarifying agent set forth in claim 9, further including an acid scavenger.

12. The clarifying agent set forth in claim 11, wherein said acid scavenger is selected from the group consisting of hydrotalcite, sodium stearate, calcium stearate, lithium stearate, calcium stearyl lactate, and any mixtures thereof 13. The clarifying agent set forth in claim 9 where said additive reacts with aldehydes to form a water insoluble reaction product within the final polyolefin matrix.

14. The clarifying agent set forth in claim 9 wherein said additive is chosen from the group consisting of sulfonyl hydrazides, N-amino imides, and any mixtures thereof 15. A composition comprising polypropylene exhibiting a haze percentage of less than 15% as measured on a 50 mil injection molded plaque in accordance with ASTM test method D1003, and an additive that reacts with free aldehydes present within said polymer in order to reduce the release of said free aldehydes from said polymer;

wherein said additive includes at least one hydrazide selected from the group consisting of adipic, pimelic, suberic, glutaric sebacic, eicosanedioic dihydrazide, and any mixtures thereof.

16. A polyolefin composition comprising a dibenzylidene sorbitol compound having the following structure:

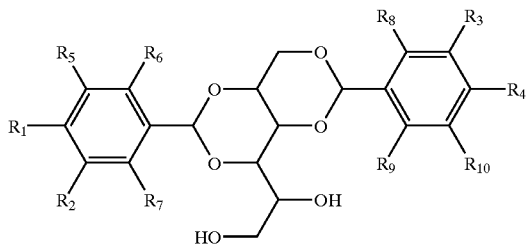

and an additive that reacts with free aldehydes present within a polyolefin matrix in order to reduce the release of said free aldehydes from said polyolefin composition; and wherein said additive is selected from the group consisting of sulfonyl hydrazides, N-amino imides, and any mixtures thereof.

17. The composition set forth in claim 16, wherein said additive reacts with said aldehydes to form a water-insoluble product.

18. The composition set forth in claim 16, wherein said polyolefin is polypropylene.

19. The composition set forth in claim 18, wherein said polypropylene is a homopolymer, and said additive does not negatively affect haze characteristics of said clarified homopolymers by more than about 10%, when measured on a 50 mil injection molded plaque in accordance with ASTM test method D1003.

20. The composition set forth in claim 18, wherein said polypropylene is a random copolymer, and said additive does not negatively affect haze characteristics of said clarified random copolymer by more than about 4%, when measured on a 50 mil injection molded plaque in accordance with ASTM test method D1003.

21. The composition set forth in claim 16, wherein said additive causes peak UV absorbances between 220–240 nm to be reduced by at least 10%, when compared to the same said polyolefin and said dibenzylidene sorbitol compound without said additive, as measured in accordance with the retort testing procedures of the Japanese Pharmacopoeia protocol, 13$^{th}$ edition, pages 76–82 (1996).

22. The composition set forth in claim 16, wherein said additive causes peak UV absorbances between 241–350 nm to be reduced by at least 10%, when compared to the same said polyolefin and said dibenzylidene sorbitol compound without said additive, as measured in accordance with the retort testing procedures of the Japanese Pharmacopoeia protocol, 13$^{th}$ edition, pages 76–82 (1996).

23. A clarifying agent for use with polyolefins, said clarifying agent comprising:

a composition including a compound having the following structure:

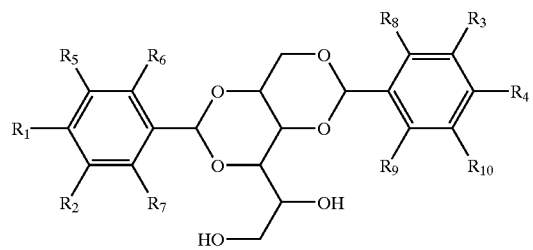

and an additive selected from the group consisting of sulfonyl hydrazides, N-amino imides, and any mixtures thereof.

24. The clarifying agent set forth in claim 23, further including an acid scavenger.

25. The clarifying agent set forth in claim 24, wherein said acid scavenger is selected from the group consisting of hydrotalcite, sodium stearate, calcium stearate, lithium stearate, calcium stearyl lactate, and any mixtures thereof.

26. The clarifying agent set forth in claim 23 where said additive reacts with aldehydes to form a water insoluble reaction product within the final polyolefin matrix.

27. A composition comprising polypropylene exhibiting a haze percentage of less than 15% as measured on a 50 mil injection molded plaque in accordance with ASTM test method D1003, and an additive that reacts with free aldehydes present within said polymer in order to reduce the release of said free aldehydes from said polymer;

wherein said additive is selected from the group consisting of sulfonyl hydrazides, N-amino imides, and any mixtures thereof.

* * * * *